(12) United States Patent
Kusaka et al.

(10) Patent No.: US 12,429,706 B2
(45) Date of Patent: Sep. 30, 2025

(54) OPTICAL ARITHMETIC DEVICE

(71) Applicant: Fujikura Ltd., Tokyo (JP)

(72) Inventors: Hiroyuki Kusaka, Tokyo (JP);
Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 442 days.

(21) Appl. No.: 17/925,518

(22) PCT Filed: Jan. 27, 2022

(86) PCT No.: PCT/JP2022/003035
§ 371 (c)(1),
(2) Date: Nov. 15, 2022

(87) PCT Pub. No.: WO2022/176554
PCT Pub. Date: Aug. 25, 2022

(65) Prior Publication Data
US 2023/0194887 A1    Jun. 22, 2023

(30) Foreign Application Priority Data
Feb. 18, 2021   (JP) .................. 2021-024503

(51) Int. Cl.
*G06N 3/067* (2006.01)
*G02B 27/42* (2006.01)
*G06E 3/00* (2006.01)

(52) U.S. Cl.
CPC ..... *G02B 27/4233* (2013.01); *G02B 27/4272* (2013.01); *G06E 3/00* (2013.01)

(58) Field of Classification Search
CPC ... G06N 3/08; G02B 27/4277; G02B 27/4205

USPC ........................................... 359/558
See application file for complete search history.

(56) References Cited

U.S. PATENT DOCUMENTS

| | | | |
|---|---|---|---|
| 7,847,225 B2 | 12/2010 | Yokoyama | |
| 9,356,692 B2 | 5/2016 | Schermer et al. | |
| 2004/0208626 A1* | 10/2004 | Nishimura | H04B 10/2537 398/161 |
| 2012/0318967 A1* | 12/2012 | Itsuji | G01J 3/28 250/252.1 |

(Continued)

FOREIGN PATENT DOCUMENTS

| | | |
|---|---|---|
| CN | 112041857 A | 12/2020 |
| EP | 0405974 A2 | 1/1991 |

(Continued)

OTHER PUBLICATIONS

International Preliminary Report on Patentability issued in corresponding International Application No. PCT/JP2022/003035, dated Aug. 22, 2023, 5 pages.

(Continued)

*Primary Examiner* — Audrey Y Chang
(74) *Attorney, Agent, or Firm* — Osha Bergman Watanabe & Burton LLP

(57) ABSTRACT

An optical computing device includes: one or more light-diffraction elements each of which includes microcells, wherein each of the microcells has an individually set thickness or refractive index; and an optical signal input section that simultaneously inputs an optical signal and a delayed optical signal obtained by delaying the optical signal to the one or more light-diffraction elements.

11 Claims, 4 Drawing Sheets

(56) References Cited

U.S. PATENT DOCUMENTS

2021/0142170 A1* 5/2021 Ozcan ................ G02B 27/4205
2022/0327371 A1* 10/2022 Ozcan ................ G02B 27/4277

FOREIGN PATENT DOCUMENTS

| JP | H04-18587 A | 1/1992 |
|---|---|---|
| JP | 200357422 A | 2/2003 |
| JP | 2006106243 A | 4/2006 |
| WO | 2010055585 A1 | 5/2010 |
| WO | 2019/147828 A1 | 8/2019 |
| WO | 2019/200289 A1 | 10/2019 |
| WO | 2020022513 A1 | 1/2020 |

OTHER PUBLICATIONS

International Search Report issued in corresponding International Application No. PCT/JP2022/003035; mailed Apr. 5, 2022 (4 pages).
Robert J. Berinato, "Acousto-optic tapped delay-line filter", Applied Optics, Optical Society of America, Oct. 10, 1993, vol. 32, No. 29, pp. 5797-5809 (13 pages).

* cited by examiner

OPTICAL ARITHMETIC DEVICE

BACKGROUND

Technical Field

The present invention relates to an optical computing device for optically performing predetermined computing.

Description of the Related Art

There is a known light-diffraction element which has a light-diffraction structure formed on one of the main surfaces of a substrate of the light-diffraction element, the light-diffraction structure including a plurality of microcells each of which has an individually set thickness or refractive index and optically performing predetermined computing by causing waves of light having passed through the respective microcells to interfere with each other. As used herein, the term "microcell" refers to a cell having a cell size of, for example, less than 10 μm. Further, the term "cell size" refers to the square root of the area of a cell.

Such a light-diffraction element has an active region in which the plurality of microcells are provided and which is irradiated with an optical signal that is a signal represented by the intensity distribution of light. The light-diffraction element converts the intensity distribution of an optical signal into a different intensity distribution by causing waves of light having passed through the respective microcells to interfere with each other, as described above. In this manner, in the light-diffraction element, predetermined optics-based computing (optical computing) is performed in the conversion of an intensity distribution.

An optical computing device in which the plurality of light-diffraction elements are used advantageously operates faster and consumes lower power than does an electrical computing device in which a processor is used. Patent Literature 1 discloses an optical neural network having an input layer, an intermediate layer, and an output layer. The light-diffraction element described above is capable of being used as, for example, the intermediate layer of such an optical neural network.

PATENT LITERATURE

Patent Literature 1: U.S. Pat. No. 7,847,225

As illustrated in FIG. 1 of Patent Literature 1, conventional optical computing devices are intended to use, as an optical signal, an image whose intensity distribution does not vary over time (i.e., still image).

A still image is an image on which the state of an object at one clock time is captured. A single still image therefore does not contain information concerning a change in the object over time (e.g., a change in position, a change in state, etc.). Accordingly, conventional optical computing devices cannot handle a change, over time, in information represented by an optical signal.

SUMMARY

One or more embodiments may provide an optical computing device that handles an optical signal whose intensity distribution changes over time.

An optical computing device according to one or more embodiments includes: one or more light-diffraction elements each including a plurality of microcells each having an individually set thickness or refractive index; and an optical signal input section configured to simultaneously input an optical signal and a delayed optical signal obtained by delaying the optical signal to the one or more light-diffraction elements at at least one timing.

An optical computing method according to one or more embodiments includes: a delaying step of delaying a part of an optical signal to generate a delayed optical signal; and an inputting step of simultaneously inputting the optical signal and the delayed optical signal to one or more light-diffraction elements at at least one timing, the one or more light-diffraction elements each including a plurality of microcells each having an individually set thickness or refractive index.

According to one or more embodiments, it is possible to provide an optical computing device that handles an optical signal whose intensity distribution changes over time.

DETAILED DESCRIPTION

Example 1

Figure 1:
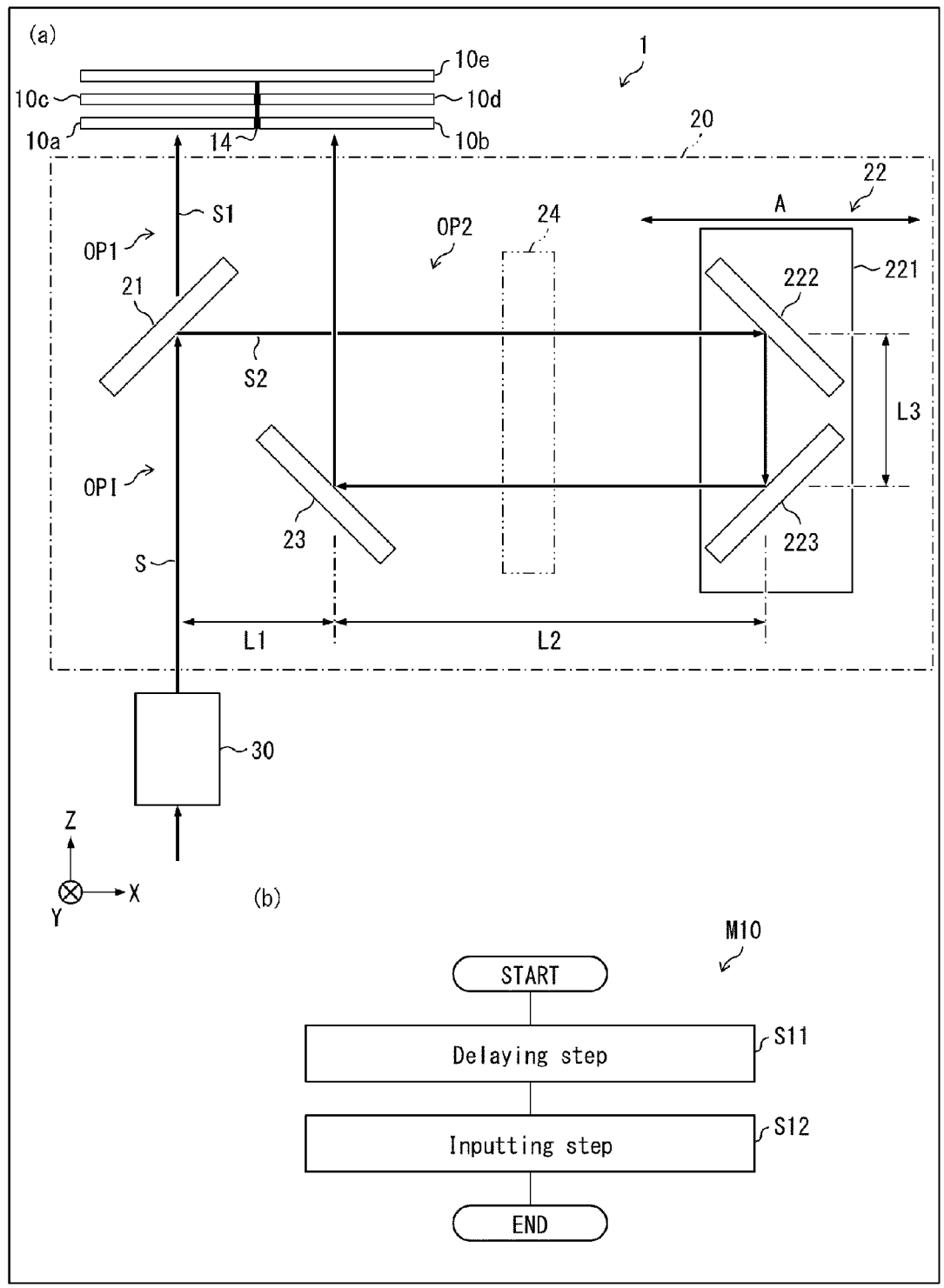
FIG. 1 is a schematic view of an optical computing device according to one or more embodiments and a flowchart of an optical computing method carried out in the optical computing device according to one or more embodiments.
Figure 2:
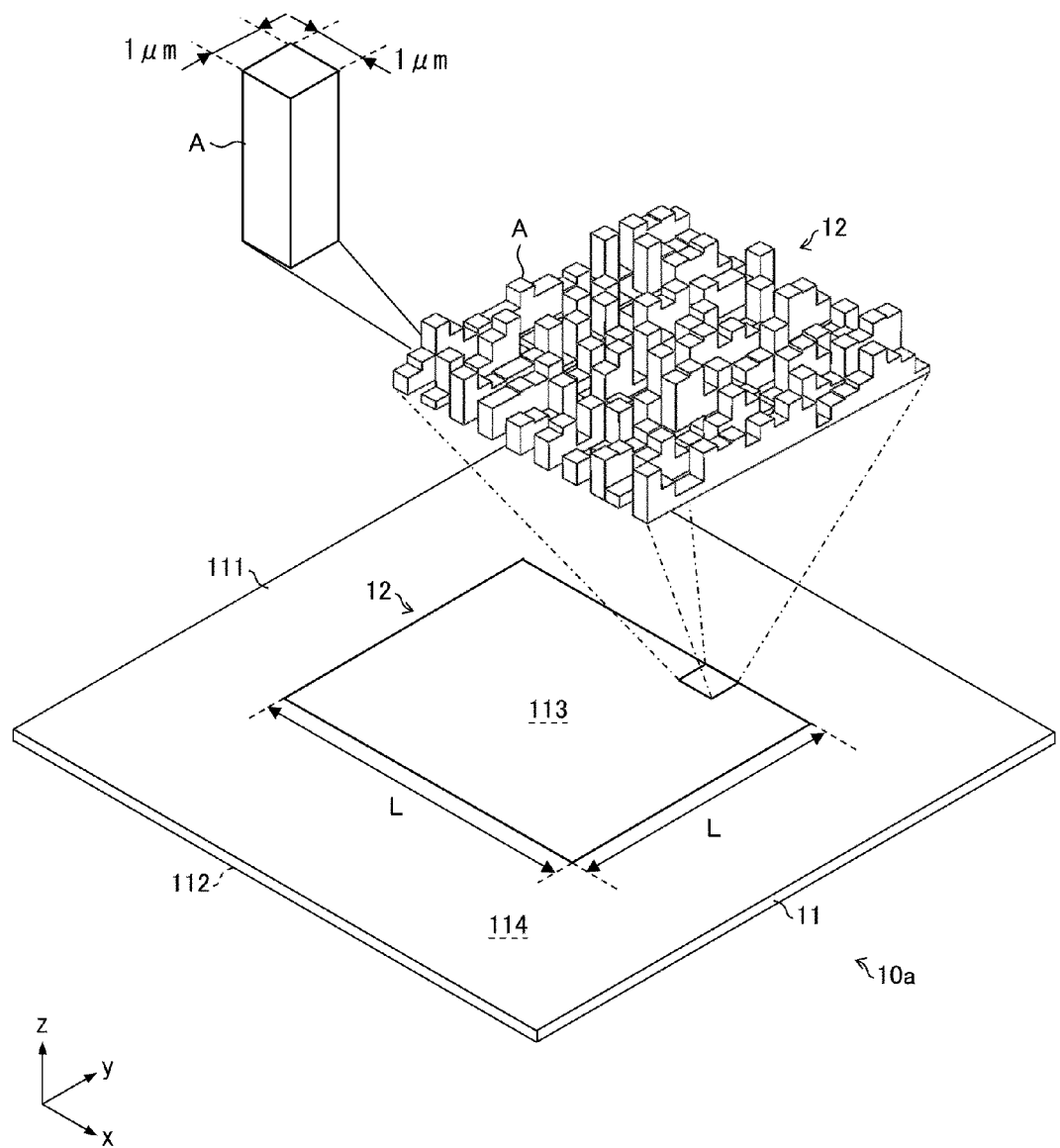
FIG. 2 is a perspective view of a light-diffraction element included in the optical computing device according to one or more embodiments.

The following description will discuss an optical computing device 1 according to one or more embodiments with reference to FIGS. 1 and 2. (a) of FIG. 1 is a schematic view of the optical computing device 1. In (a) of FIG. 1, an orthogonal coordinate system is defined such that a surface of a chassis on which the components of an optical signal input section 20 are disposed is parallel to an z-x plane of the system and a y-axis direction of the system is parallel to the vertical direction. Further, a direction in which an optical signal S is transmitted is defined as a positive z-axis direction, the vertical downward direction is defined as a positive y-axis direction, and a positive x-axis direction is defined such that the positive x-axis direction, the positive y-axis direction, and the positive z-axis direction constitute a right-handed orthogonal coordinate system. (b) of FIG. 1 is a flowchart of an optical computing method M10 carried out in the optical computing device 1. The optical computing method M10 is one or more embodiments. FIG. 2 is a perspective view of a light-diffraction element 11a included in the optical computing device 1.

As illustrated in FIG. 1, the optical computing device 1 includes: five light-diffraction elements 10a, 10b, 10c, 10d, and 10e; the optical signal input section 20; and a lens group 30.

<Lens Group>

The lens group 30 include a plurality of lenses (not illustrated in FIG. 1). The lenses are disposed along the optical axis such that the respective active regions thereof that are regions for transmitting light overlap each other. The lens group 30 is preferably configured such that it is possible to adjust a focal length within a predetermined range.

The lens group 30 is fixed to the optical signal input section 20 so that the position thereof relative to the optical signal input section 20 does not change.

The lens group 30 sets the travelling direction of a pencil of light entering the first-stage lens so that the pencil of light forms an image on an entrance surface of the light-diffraction element 10a (described later). A pencil of light inputted from the last stage of the lens group 30 to the optical signal input section 20 has an intensity distribution that changes over time at the irradiation surface of the lens group 30. Hereinafter, the pencil of light inputted to the optical signal input section 20 is referred to as an optical signal S. As above, when a fixed-point observation of the intensity distribution of the optical signal S at a predetermined position (e.g., the emission surface of the lens group 30) is performed, the intensity distribution changes over time.

The lens group 30 preferably includes a band-pass filter that allows light of a predetermined wavelength band to pass therethrough and downstream of the above plurality of lenses. In one or more embodiments, this band-pass filter transmits light of a wavelength band whose center wavelength is 800 nm and whose width is 10 nm. Note that the center wavelength and the width of the wavelength band of light that is transmitted by the band-pass filter can be determined as appropriate according to intended use of the optical computing device 1. For example, the center frequency of the band-pass filter can be determined as appropriate to fall within a wavelength band of not less than 360 nm and not more than 1000 μm. This band is constituted by a visible range (not less than 360 nm and less than 830 nm), a near-infrared range (not less than 830 nm and less than 2 μm), a mid-infrared range (not less than 2 μm and less than 4 μm), and a far-infrared range (not less than 4 μm and not more than 1000 μm).

This band-pass filter may be provided inside the optical signal input section 20 instead of the lens group 30.

<Optical Signal Input Section>

The optical signal input section 20 is configured to simultaneously input, to the light-diffraction elements 10a and 10b, intensity distributions, at different times, of the optical signal S whose intensity distribution changes over time. In other words, the optical signal input section 20 is configured to simultaneously input an optical signal (in Example 1, an optical signal S1 outputted through an optical path OP1) and a delayed optical signal (in Example 1, an optical signal S2 outputted through an optical path OP2) to the light-diffraction elements 10a and 10b at any time, the optical signal serving as a reference, the delayed optical signal being obtained by delaying the optical signal. As illustrated in FIG. 2, the optical signal input section 20 includes: a half mirror 21; a delay amount adjusting section 22; a mirror 23; and a chassis. Further, as illustrated in (b) of FIG. 1, the optical computing method M10 includes: a delaying step S11; and an inputting step S12. The delaying step S11 is a step of delaying an optical signal S2 obtained by dividing a part of the optical signal S1 to generate the optical signal S2 that is a delayed optical signal. The delaying step S11 is carried out in the delay amount adjusting section 22 (described later). The inputting step S12 is a step of simultaneously inputting the optical signal S1 and the optical signal S2 to the light-diffraction elements 10a and 10b at any time. The inputting step S12 is carried out by the half mirror 21 and the mirror 23 (described later).

The chassis not illustrated in FIG. 1 is a plate-shaped member on which the optical signal input section 20, the half mirror 21, the delay amount adjusting section 22, and the mirror 23 are disposed. The main surfaces of the chassis are parallel to the z-x plane.

The optical signal S emitted from the lens group 30 propagates parallel to the positive z-axis direction inside the optical signal input section 20. In FIG. 1, the path of a chief ray of the optical signal S is an optical path OPI.

Along the optical path OPI, the half mirror 21 is provided. When light enters at an incident angle of 45° with respect to the direction of the normal to the mirror surface of the half mirror 21, the half mirror 21 regularly reflects half of the light and transmits the remaining half of light. The half mirror 21 is fixed to the main surface of the chassis such that the mirror surface thereof is parallel to the y-axis direction and a line normal to the mirror surface thereof and the optical path OPI make an angle of 45°. Accordingly, the optical signal S enters at an incident angle of 45° with respect to the mirror surface of the half mirror 21.

(First Optical Path)

The optical signal S1 that is half of the optical signal S directly propagates parallel to the positive z-axis direction without being regularly reflected by the mirror surface and is inputted to the light-diffraction element 10a. The path of a chief ray of the optical signal S1 is an optical path OP1. The optical path OP1 is an example of the first optical path.

(Second Optical Path)

The optical signal S2 that is the remaining half of the optical signal S is regularly reflected by the mirror surface and propagates in the positive x-axis direction orthogonal to the direction along the optical path OPI. The path of a chief ray of the optical signal S2 is an optical path OP2. The optical path OP2 is an example of the second optical path.

Along the optical path OP2, the delay amount adjusting section 22 and the mirror 23 are provided in this order.

The delay amount adjusting section 22 includes: an optical stage capable of moving the position of a table 221 along one axis direction; and two mirrors 222 and 223.

The optical stage is fixed to the main surface of the chassis so that the table 221 is movable parallel to an x-axis direction. In FIG. 1, a direction in which the table 221 is movable is denoted by an arrow A.

On a main surface of the table 221, mirrors 222 and 223 are provided in this order. The mirrors 222 and 223 regularly reflect light incident on the mirror surfaces thereof.

The mirror 222 is fixed to the main surface of the table 221 such that the mirror surface thereof is parallel to the y-axis direction and a line normal to the mirror surface thereof and the optical path OP2 make an angle of 45°. Accordingly, the optical signal S2 enters at an incident angle of 45° with respect to the mirror surface of the half mirror 21, and is regularly reflected by this mirror surface in a negative z-axis direction. The mirror 223 is fixed to the main surface of the table 221 such that the mirror surface thereof is parallel to the y-axis direction and a line normal to the mirror surface thereof and the optical path OP2 make an angle of 45°. Accordingly, the optical signal S2 regularly reflected by the mirror 222 enters at an incident angle of 45° with respect to the mirror surface of the mirror 223, and is regularly reflected by this mirror surface in a negative x-axis direction.

The mirror 23 is fixed to the main surface of the chassis such that the mirror surface thereof is parallel to the y-axis direction and a line normal to the mirror surface thereof and the optical path OP2 make an angle of 45°. Accordingly, the optical signal S2 regularly reflected by the mirror 223 enters at an incident angle of 45° with respect to the mirror surface of the mirror 23, and is regularly reflected by this mirror surface in the positive z-axis direction.

The optical signal S2 regularly reflected by the mirror 23 propagates parallel to the positive z-axis direction, and is inputted to the light-diffraction element 10b.

(Difference in Optical Path Length)

As above, the half mirror 21 divides the optical path OPI along which the optical signal S is transmitted into the optical path OP1 and the optical path OP2. A real-space length that is the length of the optical path OP2 in real space is longer than the real-space length of the optical path OP1 by a difference of ΔL. As is shown in FIG. 1, the difference ΔL is determined by using the formula ΔL=L1+2L2+2L3.

The optical path length of an optical path is determined by calculating the product of the difference ΔL in real space and the refractive index of a medium with which the optical path is filled. In one or more embodiments, both the optical path OP1 and the optical path OP2 are filled with air. Accordingly, the refractive index of the medium with which the optical path is filled is assumed to be approximately 1, and the difference in the optical path length between the optical path OP1 and the optical path OP2 is therefore substantially equal to the difference ΔL.

As above, in the optical signal input section 20, the optical path OP2 is longer in optical path length than the optical path OP1. The optical signal input section 20 is therefore capable of simultaneously inputting the optical signals S1 and S2 to the light-diffraction elements 10a and 10b, the optical signals S1 and S2 having respective intensity distributions of the optical signal S at different times. The optical signal S1 is an optical signal used for the optical signal S2 (described later) as a reference. The optical signal S2 is a delayed optical signal obtained by delaying the optical signal S1.

(Delay Amount Adjusting Section)

As described above, the delay amount adjusting section 22 is capable of moving the position of the table 221 along the x-axis direction. When the table 221 is moved in the negative x-axis direction (when the table 221 is moved toward the half mirror 21 and the mirror 23), the difference ΔL decreases. Conversely, when the table 221 is moved in the positive x-axis direction (when the table 221 is moved away from the half mirror 21 and the mirror 23), the difference ΔL increases. The delay amount adjusting section 22 is therefore capable of changing a delay amount that is a difference in the clock time of input to the light-diffraction elements 10a and 10b between the optical signals S1 and S2, by adjusting the position of the table 221.

Along the optical path OP2, a high-refractive index member made of a material higher in refractive index than air may be provided. Examples of the high-refractive index member include a plate-shaped member 24 made of a light-transmissive resin, the plate-shaped member 24 being provided between the half mirror 21 and the delay amount adjusting section 22 and between the delay amount adjusting section 22 and the mirror 23. In FIG. 1, the plate-shaped member 24 is illustrated by using an imaginary line (dashed-two dotted line). Note that the plate-shaped member 24 may be provided either between the half mirror 21 and the delay amount adjusting section 22 or between the delay amount adjusting section 22 and the mirror 23. Further, the plate-shaped member 24 may be provided between the mirror 222 and the mirror 223. The high-refractive index member is not limited to a plate-shaped member. The shape of the high-refractive index member can be specified as appropriate, and may be, for example, a block shape.

When the thickness (the length in the x-axis direction) of the plate-shaped member 24 is made greater or the refractive index of the resin of the plate-shaped member 24 is made higher, it is possible to make greater the difference in optical path length between the optical path OP1 and the optical path OP2. The plate-shaped member 24 therefore also serves as a delay amount adjusting section that changes a delay amount that is a difference in the clock time of input to the light-diffraction elements 10a and 10b between the optical signals S1 and S2.

(Timing of Input of Each of Optical Signals to Light-Diffraction Elements)

In the optical computing device 1 configured as illustrated in (a) of FIG. 1, the optical signal input section 20 is configured to simultaneously input the optical signal S1 and the optical signal S2 to the light-diffraction elements 10a and 10b at any time. However, according to one or more embodiments, the optical signal input section 20 may be configured to simultaneously input the optical signal S1 and the optical signal S2 to the light-diffraction elements 10a and 10b at at least one timing. In other words, the optical signal input section 20 may be configured to input the optical signal S1 and the optical signal S2 so as to input either the optical signal S1 or the optical signal S2 to the light-diffraction element 10a or the light-diffraction element 10b at a timing other than the at least one timing.

As a mechanism to input the optical signals S1 and S2 respectively to the light-diffraction elements 10a and 10b or block such an input, at any timing, shutters provided along the respective optical paths OP1 and OP2 can be used.

Note that also in the optical computing method M10 illustrated in (b) of FIG. 1, the optical signal S1 and the optical signal S2 may be simultaneously inputted to the light-diffraction elements 10a and 10b at at least one timing.

<Light-Diffraction Element>

As illustrated in FIG. 1, provided downstream of the optical signal input section 20 are the light-diffraction elements 10a, 10b, 10c, 10d, and 10e. The following description will discuss the configuration of the light-diffraction elements by taking the light-diffraction element 10a as an example. The light-diffraction elements 10b, 10c, and 10d have a configuration the same as that of the light-diffraction element 10a. Further, although the light-diffraction element 10e has a configuration similar to that of the light-diffraction element 10a, the shape and the size of a central portion 113 is different. The central portion 113 of the light-diffraction element 10a is a square having sides L (see FIG. 2) that are 200 μm long. Whereas the central portion 113 of the light-diffraction element 10e is a rectangle whose short side is 200 μm long and whose long side is 400 μm long.

(Configuration)

As illustrated in FIG. 2, the light-diffraction element 10a includes: a base material 11; and a light-diffraction structure 12.

The base material 11 is a layered member (e.g., a film) having a main surface 111 and a main surface 112 that face each other. The base material 11 is made of a light-transmissive material. The main surface 111 is an example of one of the main surfaces of the base material 11. Hereinafter, a portion located at the center of the main surface 111 of the base material 11 is referred to as the central portion 113, and an annular portion surrounding the central portion 113 is referred to as an annular portion 114. In FIG. 2, the central portion 113 being located under the light-diffraction structure 12 is indicated by drawing a dashed line under the reference sign "113".

In one or more embodiments, an acrylic resin is employed as a material of which the base material 11 is made. However, the material of which the base material 11 is made only needs to have light transmissivity with respect to the wavelength band of light to be used a signal light, and is not limited to a resin typified by an acrylic resin. A material of which the base material 11 is made may be a glass material typified by quartz glass.

The material of which the base material 11 is made is preferably a material having a property of adhering well to the resin (e.g., photo-curable resin) of the light-diffraction structure 12 (described later) when the light-diffraction structure 12 is formed on the main surface 111.

In one or more embodiments, a thickness of 5 µm is employed as the thickness of the base material 11. A resin film of such a thickness is flexible, and therefore cannot stand on its own. The thickness of the base material 11 is not limited to 5 µm.

When the base material 11 is seen in plan view from a direction of the normal to the main surface 111, the shape (hereinafter, referred to as the shape in plan view) thereof is a square. The base material 11 only needs to be larger in size than the central portion 113 (described later), and the size and the shape thereof can be determined as appropriate.

The light-diffraction structure 12 is formed in the central portion 113. In one or more embodiments, the central portion 113 is, for example, a square having sides L that are 200 µm long. The light-diffraction structure 12 includes a plurality of microcells A having respective thicknesses or refractive indexes that are set independently of each other (see FIG. 2). In one or more embodiments, each of the microcells A is made of a light-transmissive resin (e.g., photo-curable resin). Alternatively, the light-diffraction structure 12 may be made of glass (e.g., quartz glass).

When signal light enters the light-diffraction structure 12, waves of the signal light having passed through respective microcells A interfere with each other, and a predetermined optical computing is thereby performed. The intensity distribution of the signal light outputted from the light-diffraction structure 12 represents the result of the optical computing.

As used herein, the term "microcell" refers to a cell having a cell size of, for example, less than 10 µm. Further, the term "cell size" refers to the square root of the area of a cell. For example, when the shape of the microcell in plan view is a square, the cell size is the length of the sides of the cell. The lower limit of the cell size is not limited to any particular value, but is 1 nm, for example.

The light-diffraction structure 12 illustrated in the enlarged view of FIG. 1 includes 20×20 microcells A disposed in a matrix. The shape of each microcell A in plan view is, for example, a 1 µm×1 µm square, and the shape of the light-diffraction structure 12 in plan view is, for example, a 200 µm×200 µm square.

The cell size, the shape of each microcell A in plan view, and the shape of the light-diffraction structure 12 in plan view are not limited to the above examples, but are determined as appropriate.

(Optical Computing Performed on Optical Signal)

The light-diffraction element 10a is disposed such that the optical signal S1 having propagated along the optical path OP1 is inputted to an entrance surface of the light-diffraction element 10a. The light-diffraction element 10a performs predetermined computing on the optical signal S1.

The light-diffraction element 10b is disposed such that the optical signal S2 having propagated along the optical path OP2 is inputted to an entrance surface of the light-diffraction element 10b. The light-diffraction element 10b performs predetermined computing on the optical signal S2.

The light-diffraction element 10c is disposed downstream of the light-diffraction element 10a such that the respective active regions of the light-diffraction elements 10a and 10c overlap each other. The light-diffraction element 10c performs predetermined optical computing on the optical signal S1 on which the light-diffraction element 10a has performed optical computing.

The light-diffraction element 10d is disposed downstream of the light-diffraction element 10b such that the respective active regions of the light-diffraction elements 10b and 10d overlap each other. The light-diffraction element 10d performs predetermined optical computing on the optical signal S2 on which the light-diffraction element 10b has performed optical computing.

The light-diffraction element 10a and the light-diffraction element 10b are independent of each other. The light-diffraction element 10c and the light-diffraction element 10d are independent of each other. A light-blocking plate 14 that does not transmit light is provided between the light-diffraction element 10a and the light-diffraction element 10b and between the light-diffraction element 10c and the light-diffraction element 10d.

Therefore, the light-diffraction element 10a and the light-diffraction element 10c cause only waves of the optical signal S1 having passed through the respective microcells to interfere with each other, and do not cause waves of the optical signal S2 to interfere with each other. In other words, the light-diffraction element 10a and the light-diffraction element 10c perform optical computing only on the optical signal S1 and do not affect the optical signal S2. Similarly, the light-diffraction element 10b and the light-diffraction element 10d cause only waves of the optical signal S2 having passed through the respective microcells to interfere with each other and do not cause waves of the optical signal S1 to interfere with each other. In other words, the light-diffraction element 10b and the light-diffraction element 10d perform optical computing only on the optical signal S2 and do not affect the optical signal S1.

The light-diffraction element 10e is disposed downstream of the light-diffraction element 10c and the light-diffraction element 10d. The active region of the light-diffraction element 10e overlaps the active region of the light-diffraction element 10c and the active region of the light-diffraction element 10d.

Unlike the light-diffraction elements 10a to 10d, the light-diffraction element 10e causes waves of the optical signal S1 having passed through the respective microcells and waves of the optical signal S2 having passed through the respective microcells to interfere with each other. In other words, the light-diffraction element 10e affects the optical signal S1 and the optical signal S2.

In one or more embodiments, the light-diffraction elements in three stages are employed. However, the number of stages of the light-diffraction elements is not limited to three, but can be determined as appropriate. Further, in one or more embodiments, the first-stage light-diffraction element is provided so as to be exclusive to the optical path OP1 and the second-stage light-diffraction element is provided so as to be exclusive to the optical path OP2. Alternatively, each of the first-stage light-diffraction element and the second-stage light-diffraction element can be provided so as to be common to both the optical path OP1 and the optical path OP2, like the third light-diffraction element 10e. Further, in one or more embodiments, the third-stage light-diffraction element is provided so as to be common to both the optical path OP1 and the optical path OP2. However, the third-stage light-diffraction element can be provided so as to be exclusive to each of the optical path OP1 and the optical path OP2.

<Variation>

Figure 3:
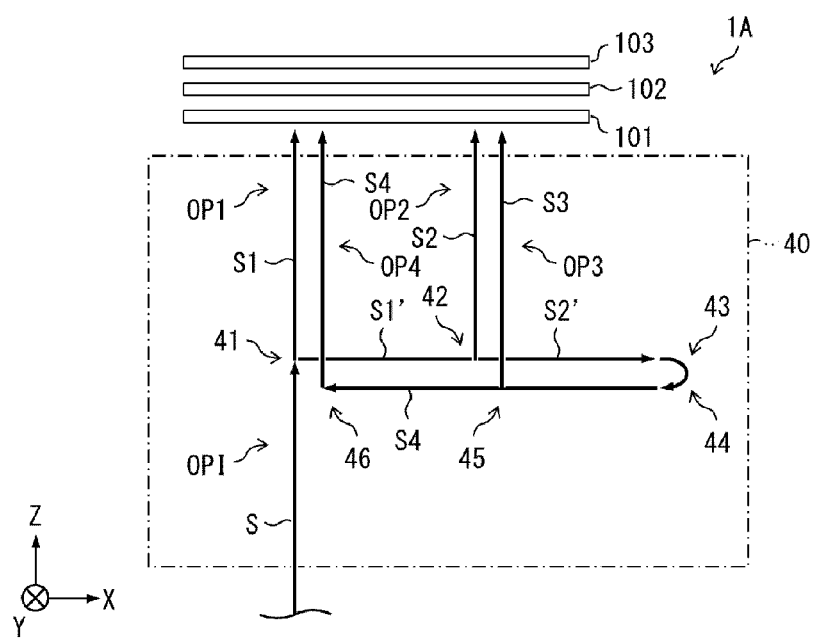
FIG. 3 is a schematic view of a variation of the optical computing device according to one or more embodiments.
Figure 4:
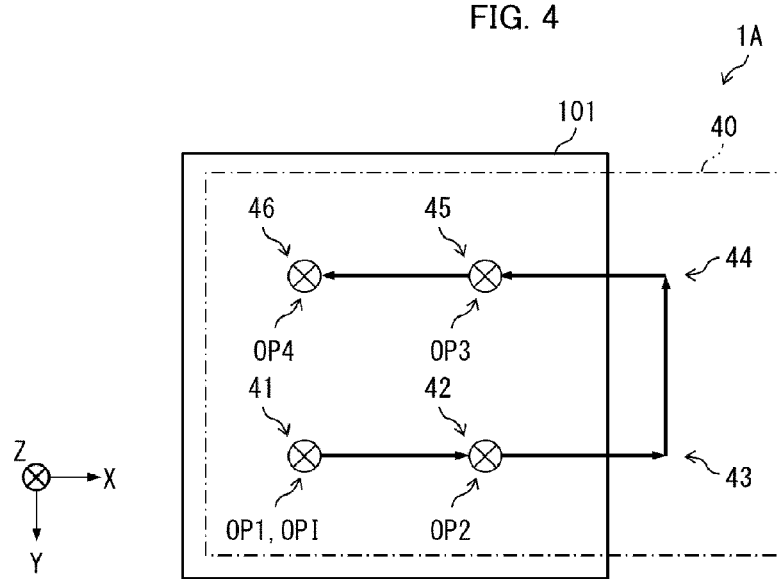
FIG. 4 is a schematic view of a variation of the optical computing device according to one or more embodiments.

The following description will discuss an optical computing device 1A which is a variation of the optical computing device 1 illustrated in FIG. 1, with reference to FIGS. 3 and 4. FIGS. 3 and 4 are each a schematic view of the optical computing device 1A. FIG. 3 is a schematic view of the chassis of the optical signal input section, the chassis being seen in plan view, like the case with FIG. 1. FIG. 4 is a schematic view of the first-stage light-diffraction element that is seen in plan view from a direction of input of an optical signal.

As illustrated in FIG. 3, the optical computing device 1A includes: three light-diffraction elements 101, 102, and 103; and an optical signal input section 40. Although not illustrated in FIG. 3, a lens group the same as the lens group 30 of the optical computing device 1 is also included in the optical computing device 1A.

A light-diffraction element 101 of the optical computing device 1A corresponds to the light-diffraction elements 10a and 10b of the optical computing device 1, a light-diffraction element 102 of the optical computing device 1A corresponds to the light-diffraction elements 10c and 10d of the optical computing device 1, and a light-diffraction element 103 of the optical computing device 1A corresponds to the light-diffraction element 10e of the optical computing device 1.

In each of the light-diffraction elements 101 to 103, the central portion 113 (see FIG. 2) in which the microcells A are provided is a square having sides L that are 400 µm long. Each of the light-diffraction elements 101 to 103 causes waves of the optical signals S1 to S4 each having passed through the respective microcells A to interfere with each other. In other words, each of the light-diffraction elements 101 to 103 affects any of the optical signals S1 to S4.

(Optical Signal Input Section)

The optical signal input section 40 of the optical computing device 1A is obtained by modifying the optical signal input section 20 of the optical computing device 1. The optical computing device 1 includes a single half mirror 21, and is configured to divide an optical path OPI of an optical signal S into two optical paths that are the optical paths OP1 and OP2. Whereas the optical computing device 1A includes three half mirrors 41, 42, and 45, and is configured to divide the optical path OPI of the optical signal S into four optical paths that are optical paths OP1, OP2, OP3, and OP4. The description of the optical signal input section 40 of the present variation will discuss this respect. Note that in FIGS. 3 and 4, the respective positions of the half mirrors 41, 42, and 45 and the respective positions of the mirrors 43, 44, and 46 are indicated by using arrows with reference signs, and the illustration of substantial shapes of the half mirrors and the mirrors are omitted.

(First Optical Path)

Like the case with the optical signal input section 20, along the optical path OPI, the half mirror 41 corresponding to the half mirror 21 is provided. When light enters at an incident angle of 45° with respect to a direction of the normal to the mirror surface of the half mirror 41, the half mirror 41 regularly reflects 75% of the light and transmits the remaining 25% of the light. The optical signal S enters at an incident angle of 45° with respect to the mirror surface of the half mirror 41.

An optical signal S1 that is 25% of the optical signal S directly propagates in the positive z-axis direction without being regularly reflected by the mirror surface, and is inputted to the light-diffraction element 101. The path of a chief ray of the optical signal S1 is an optical path OP1. The optical path OP1 is an example of the first optical path.

(Second Optical Path)

An optical signal S1' that is the remaining 75% of the optical signal S is regularly reflected by the mirror surface, and propagates in the positive x-axis direction orthogonal to the direction along the optical path OPI.

Along an optical path of the optical signal S1' having been regularly reflected by the half mirror 41, the half mirror 42 is provided. When light enters at an incident angle of 45° with respect to a direction of the normal to the mirror surface of the half mirror 42, the half mirror 42 regularly reflects 33.3% of the light and transmits the remaining 66.6% of the light. The optical signal S1' enters at an incident angle of 45° with respect to the mirror surface of the half mirror 42.

An optical signal S2 that is 33.3% of the optical signal S1' is regularly reflected by the mirror surface, propagates in the positive z-axis direction, and is inputted to the light-diffraction element 101. The path of chief rays of the optical signal S1' and the optical signal S2 is an optical path OP2. The optical path OP2 is an example of the second optical path.

(Third Optical Path)

An optical signal S2' that is the remaining 66.6% of the optical signal S1' directly propagates in the positive x-axis direction without being regularly reflected by the mirror surface of the half mirror 42.

Along an optical path of the optical signal S2', the mirrors 43 and 44 and the half mirror 45 are provided. The mirrors 43 and 44 are arranged in a manner similar to the arrangement of the mirrors 222 and 223 illustrated in FIG. 1. The optical signal S2' is therefore regularly reflected by the mirrors 222 and 223 and propagates in the negative x-axis direction.

When light enters at an incident angle of 45° with respect to a direction of the normal to the mirror surface of the half mirror 45, the half mirror 45 regularly reflects 50% of the light and transmits the remaining 50% of the light. The optical signal S2' enters at an incident angle of 45° with respect to the mirror surface of the half mirror 43.

An optical signal S3 that is 50% of the optical signal S2' is regularly reflected by the mirror surface of the half mirror 45, propagates in the positive z-axis direction, and is inputted to the light-diffraction element 101. The path of chief rays of the optical signal S2' and the optical signal S3 is an optical path OP3. The optical path OP3 is an example of the third optical path.

(Fourth Optical Path)

An optical signal S4 that is the remaining 50% of the optical signal S2' directly propagates in the negative x-axis direction without being regularly reflected by the mirror surface of the half mirror 45.

Along an optical path of the optical signal S4, the mirror 46 is provided. The optical signal S4 having passed through the half mirror 45 enters at an incident angle of 45° with respect to the mirror surface of the mirror 46, and is regularly reflected by the mirror surface in the positive z-axis direction.

The optical signal S4 having been regularly reflected by the mirror 46 propagates parallel to the positive z-axis direction, and is inputted to the light-diffraction element 101. The path of a chief ray of the optical signal S4 is an optical path OP4. The optical path of OP4 is an example of the fourth optical path.

(Difference in Optical Path Length)

As above, the half mirrors 41, 42, and 45 divide the optical path OPI along which the optical signal S is transmitted into the optical paths OP1 to OP4. The real-space lengths, which are lengths in real space, of the optical paths OP1 to OP4 are ranked in the ascending order as follows: the optical paths OP1, OP2, OP3, and OP4.

As above, the respective optical path lengths of the optical paths OP1 to OP4 are different from each other in the optical signal input section 40. This makes it possible to simultaneously input the optical signals S1, S2, S3, and S4 to the light-diffraction element 101, the optical signals S1, S2, S3, and S4 having respective intensity distributions of the optical signal S at four different times. The optical signal S1 is an optical signal used for the optical signals S2, S3, and S4 (described later) as a reference. Further, any of the optical signals S2, S3, and S4 is a delayed optical signal obtained by delaying the optical signal S1.

Example 2

Figure 5:
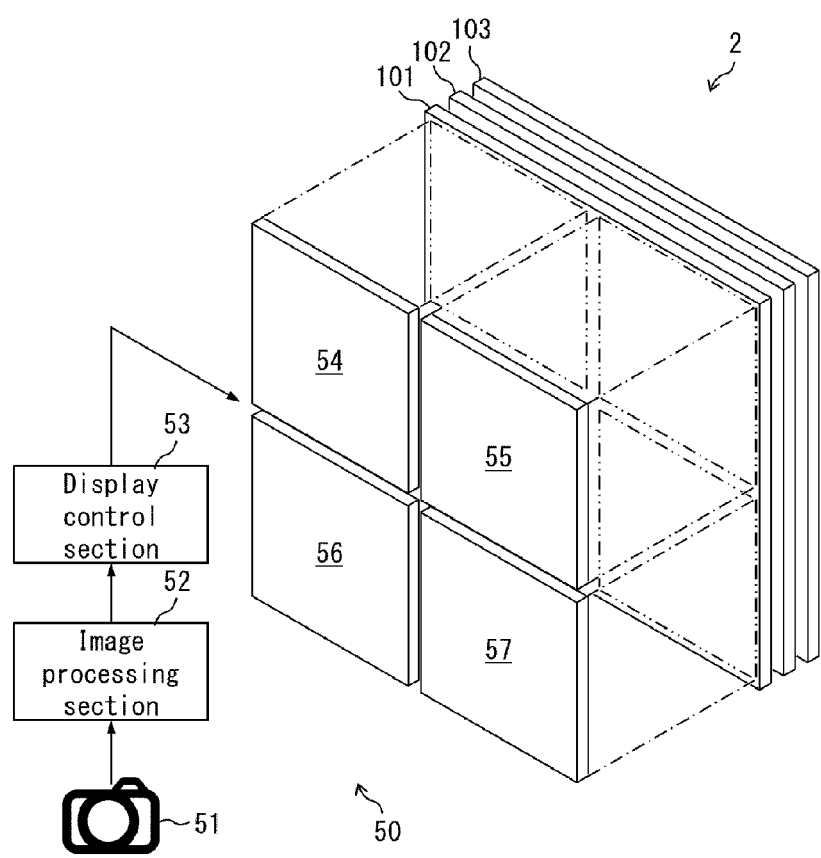
FIG. 5 is a perspective view of an optical computing device according to one or more embodiments.

The following description will discuss an optical computing device 2 according to one or more embodiments with reference to FIG. 5. FIG. 5 is a perspective view of the optical computing device 2.

As illustrated in FIG. 5, the optical computing device 2 include: an optical signal input section 50; and light-diffraction elements 101 to 103. The light-diffraction elements 101 to 103 of the optical computing device 2 have a configuration the same as that of the light-diffraction elements 101 to 103 (see FIG. 3) of the optical computing device 1A have. Discussed in the description of one or more embodiments is the optical signal input section 50, accordingly.

<Optical Signal Input Section>

As illustrated in FIG. 5, the optical signal input section 50 includes: an image taking section 51; an image processing section 52; a display control section 53; and display sections 54 to 57.

The image taking section 51 includes: a lens group including a plurality of lenses; and an image sensor.

The lens group sets the travelling direction of a pencil of light entering the first-stage lens so that the pencil of light forms an image on an entrance surface of the light-diffraction element 10*a* (described later). A pencil of light inputted from the last stage of the lens group to the image sensor has an intensity distribution that changes over time at the irradiation surface of the lens group. Hereinafter, the pencil of light inputted to the image sensor is referred to as an optical signal S.

The image sensor converts the optical signal S incident on a light-receiving surface thereof into an electrical signal, and feed the electrical signal into the image processing section 52.

The image processing section 52 generates a moving image from the electrical signals fed from the image sensor. The moving image includes a plurality of still images represented in respective frames. The still images represented in the respective frames are an example of the intensity distributions of the optical signal S at different times. The image processing section 52 generates a moving image at a frame rate that is not limited to any rate, but can be determined as appropriate according to the moving speed of the object. When the object moves at high speed, it is preferable to set the frame rate to a high rate. Examples of the frame rate include 100,000 fps (frame/sec).

The display control section 53 displays each of the images of four frames different from each other, among the frames constituting a single moving image generated by the image processing section 52, on corresponding one of the display sections 54 to 57. In this displaying, the display control section 53 is preferably displays the images of the four frames on the display sections 54 to 57, by using light of a single wavelength (e.g., 800 nm).

The display control section 53 can determine as appropriate a frame interval of the frames to be displayed on the respective display sections 54 to 57. As an example, when the frame rate of a moving image is 100,000 fps, it is possible to detect a movement of an object that is of an order of magnitude of 10 μsec by displaying four images for every 1 frame on the respective display sections 54 to 57. As another example, when four images for every 100 frame are displayed on the respective display sections 54 to 57, it is possible to detect a movement of an object that is of an order of magnitude of 1 msec. As above, the display control section 53 can change the delay amount that is a time difference of the optical signal S by controlling the frame interval of the frames to be displayed on the respective display sections 54 to 57. Therefore, the display control section 53 is an example of the delay amount adjusting section.

Each of the display sections 54 to 57 is an organic electro luminescence (EL) display. Alternatively, each of the display sections 54 to 57 may be a liquid crystal display. Since the response speeds of organic EL displays are higher than those of liquid crystal displays, it is preferable to use organic EL displays as the display sections of the optical computing device 2. In order for optical computing to be performed with the use of the light-diffraction elements 101 to 103, images to be inputted to the light-diffraction elements 101 to 103 are preferably represented by using light of a single wavelength. Each of the display sections 54 to 57 is therefore not required to have color displaying capability, and may be a monochrome display capable of displaying a single color (of, for example, a wavelength of 800 nm). By using a monochrome display to form each of the display sections 54 to 57, it is possible to achieve higher resolution than by using a color display.

In accordance with a control signal from the display control section 53, the respective display sections 54 to 57 simultaneously display the images of four frames different from each other. Each of the display sections 54 to 57 is disposed so as to face the light-diffraction element 101. This makes it possible to simultaneously input the images of four frames different from each other to light-diffraction element 101. The images of four frames of a moving image that are different from each other are an example of the optical signal. When an image (in Example 2, the image displayed by the display section 54) that is chronologically the earliest of four images of different frames is used as a reference optical signal, any of the images (in Example 2, images displayed by the display sections 55 to 57) of the chronologically succeeding frames is deemed to be a delayed optical signal. In this manner, the optical signal input section 50 of the optical computing device 2 is capable of simultaneously inputting, to the light-diffraction element 101, an optical signal serving as a reference and a delayed optical signal obtained by delaying the optical signal.

Note that an optical system such as a lens may be interposed between the display sections 54 to 57 and the light-diffraction element 101.

One or more embodiments can also be expressed as follows:

An optical computing device in according to one or more embodiments includes: one or more light-diffraction elements each including a plurality of microcells each having an individually set thickness or refractive index; and an optical signal input section configured to simultaneously input intensity distributions, at different times, of an optical signal whose intensity distribution changes over time to the one or more light-diffraction elements at at least one timing. In other words, the optical signal input section of the optical computing device is configured to simultaneously input an optical signal and a delayed optical signal obtained by delaying the optical signal to the one or more light-diffraction elements at at least one timing.

With the above configuration, the intensity distributions, at different times, of an optical signal are simultaneously inputted to the one or more light-diffraction elements. In other words, with the above configuration, an optical signal and a delayed optical signal are simultaneously inputted to the one or more light-diffraction elements. The optical computing device is therefore capable of handling an optical signal whose intensity distribution changes over time.

In an optical computing device according to one or more embodiments, employed, in addition to the above configuration of the optical computing device in accordance with the first aspect, is a configuration in which the optical signal input section is configured to divide an optical path along which the optical signal is transmitted into a first optical path and a second optical path longer in optical path length than the first optical path, and input an optical signal outputted through the first optical path and an optical signal outputted through the second optical path to the one or more light-diffraction elements. In other words, in the optical computing device, employed, in addition to the above configuration of the optical computing device in accordance with the first aspect, is a configuration in which the optical signal input section is configured to input the optical signal outputted through the first optical path and the delayed optical signal outputted through the second optical path to the one or more light-diffraction elements.

With the above configuration, since the second optical path is longer in optical path length than the first optical path, the time at which an optical signal is outputted through the second optical path is later than the time at which an optical signal is outputted through the first optical path. The optical computing device therefore makes it possible to facilitate the generation of a delayed optical signal obtained by delaying the optical signal outputted through the first optical path by using the optical signal as a reference optical signal. The optical computing device therefore makes it possible to facilitate the simultaneous input of optical signals having respective intensity distributions at different times (i.e., the reference optical signal and the delayed optical signal) to the one or more light-diffraction elements.

Further, the optical computing device makes it possible to facilitate the reduction in a delay amount that is a difference between the time at which an optical signal is outputted through the first optical path and the time at which an optical signal is outputted through the second optical path. The optical computing device is therefore capable of handling high-speed information, whose intensity distribution changes within a short period of time.

In an optical computing device according to one or more embodiments, employed, in addition to the above configuration of the optical computing device in accordance with the second aspect, is a configuration in which a high-refractive index member made of a material higher in refractive index than air is provided along the second optical path.

With the above configuration, an optical signal transmitted along the second optical path is made later while being transmitted through the high-refractive index member than is an optical signal transmitted through the second optical path. The optical computing device is therefore capable of surely making later the time at which an optical signal is outputted through the second optical path than the time at which an optical signal is outputted through the first optical path.

In an optical computing device according to one or more embodiments, employed, in addition to the above configuration of the optical computing device in accordance with the second aspect or the third aspect, is a configuration in which the second optical path is longer than the first optical path in real-space length, and is filled with a medium lower than or equal to air in refractive index.

In an optical computing device according to one or more embodiments, employed, in addition to the above configuration of the optical computing device in accordance with the optical computing device in accordance with the second aspect or the third aspect, is a configuration in which the second optical path is longer than the first optical path in real-space length, and is filled with a medium lower than or equal to air in refractive index.

With the above configuration, it is possible to make longer the optical path length of the second optical path than the optical path length of the first optical path by using a simple configuration. The optical path length of an optical path can be determined by calculating the product of the real-space length of the optical path and a refractive index.

In an optical computing device according to one or more embodiments, employed in addition to the above configuration of the optical computing device in accordance with any one of the second to fourth aspects, is a configuration in which further included is a half mirror provided along the optical path along which the optical signal is transmitted, the half mirror dividing a transmission path of the optical signal into a first optical path and a second optical path that are different from each other.

With the above configuration, it is possible to easily generate, from a single optical signal, two optical signals that have the same intensity distribution.

In an optical computing device according to one or more embodiments, employed, in addition to the above configuration of the optical computing device in accordance with the first aspect, is a configuration in which the optical signal input section is configured to display a plurality of images of respective frames different from each other, the plurality of images being included in a single moving image, and input each of the plurality of images to corresponding one of the one or more light-diffraction elements.

The image of each of the frames included in the moving image is an example of the optical signal. When an image that is chronologically the earliest of the plurality of images of different frames is used as a reference optical signal, any of the images of the chronologically succeeding frames is deemed to be a delayed optical signal. With the above configuration, it is possible to facilitate the simultaneous input of a plurality of optical signals having intensity distributions at different times to one or more light-diffraction elements.

In an optical computing device according to one or more embodiments, employed, in addition to the above configuration of the optical computing device in accordance with any one of the first to sixth aspects, is a configuration in which the optical signal input section includes a delay amount adjusting section configured to change a delay amount that is a difference between times at which respective optical signals are inputted to the one or more light-diffraction elements. In other words, the optical signal input section of the optical computing device includes a delay amount adjusting section configured to change a delay amount to be generated between the optical signal and the delayed optical signal.

With the above configuration, it is possible to change a delay amount of each of the optical signals to be inputted to the one or more light-diffraction elements, and therefore possible to employ a delay amount appropriate to a rate at which the intensity distribution of an optical signal changes.

An optical computing method according to one or more embodiments includes a step of simultaneously inputting intensity distributions, at different times, of an optical signal whose intensity distribution of light changes over time to the one or more light-diffraction elements at at least one timing. In other words, the optical computing method includes: a delaying step of delaying a part of an optical signal to generate a delayed optical signal; and an inputting step of simultaneously inputting the optical signal and the delayed optical signal to one or more light-diffraction elements at at least one timing, the one or more light-diffraction elements each including a plurality of microcells each having an individually set thickness or refractive index.

The optical computing method thus configured has an effect similar to that of the above-described optical computing device in accordance with the first aspect.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1A, 2: Optical computing device
10a to 10e, 101 to 103: Light-diffraction element
A: Microcell
20: Optical signal input section
21: Half mirror
22: Delay amount adjusting section
24: Plate-shaped member (Delay amount adjusting section)
OP1, OP2: First optical path, Second optical path
40, 50: Optical signal input section
41, 42, 45: Half mirror
51: Image taking section
52: Image processing section
53: Display control section (Delay amount adjusting section)
54 to 57: Display section

The invention claimed is:

1. An optical computing device comprising:
one or more light-diffraction elements, each of which includes microcells, wherein each of the microcells has an individually set thickness or refractive index; and
an optical signal input section that simultaneously inputs an optical signal and a delayed optical signal obtained by delaying the optical signal to the one or more light-diffraction elements.

2. The optical computing device according to claim 1, wherein the optical signal input section:
divides an optical path through which the optical signal is transmitted into a first optical path having a first length and a second optical path having a second length longer than the first length, and
inputs the optical signal outputted through the first optical path and the delayed optical signal outputted through the second optical path to the one or more light-diffraction elements.

3. The optical computing device according to claim 2, further comprising:
a high-refractive index member including a material higher in refractive index than air and disposed in the second optical path.

4. The optical computing device according to claim 2, wherein the second optical path is longer than the first optical path in a real-space length, and is filled with a medium lower than or equal to air in refractive index.

5. The optical computing device according to claim 2, wherein the optical signal input section comprises a half mirror disposed in the optical path and divides a transmission path of the optical signal into the first optical path and the second optical path.

6. The optical computing device according to claim 1, wherein the optical signal input section:
displays images of respective frames different from each other, the images being included in a single moving image, and
inputs each of the images to corresponding one of the one or more light-diffraction elements.

7. The optical computing device according to claim 1, wherein the optical signal input section comprises a delay amount adjusting section that changes a delay amount between the optical signal and the delayed optical signal.

8. The optical computing device according to claim 7, wherein the delay amount adjusting section comprises:
an optical stage that moves a position of a table; and
two mirrors disposed on a surface of the table.

9. The optical computing device according to claim 1, wherein at least one of the one or more light-diffraction elements causes interference between the optical signal and the delayed optical signal that have passed through the at least one of the one or more light-diffraction elements.

10. An optical computing method comprising:
delaying a part of an optical signal to generate a delayed optical signal; and
simultaneously inputting the optical signal and the delayed optical signal to one or more light-diffraction elements, wherein each of the one or more light-diffraction elements includes microcells each having an individually set thickness or refractive index.

11. The optical computing method according to claim 10, further comprising:
after the simultaneous inputting of the optical signal and the delayed optical signal, causing interference between the optical signal and the delayed optical signal that have passed through at least one of the one or more light-diffraction elements.

* * * * *